July 22, 1969  L. D. MAGNUSON  3,456,506
HIGH ALTITUDE RATE OF CLIMB INDICATOR
Filed June 28, 1967  2 Sheets-Sheet 1

INVENTOR
LEO D. MAGNUSON
BY James L. O'Brien
ATTORNEY

July 22, 1969　　　　L. D. MAGNUSON　　　　3,456,506
HIGH ALTITUDE RATE OF CLIMB INDICATOR
Filed June 28, 1967　　　　　　　　　　　2 Sheets-Sheet 2

INVENTOR
LEO D. MAGNUSON
BY
ATTORNEY

United States Patent Office 3,456,506
Patented July 22, 1969

3,456,506
HIGH ALTITUDE RATE OF CLIMB INDICATOR
Leo D. Magnuson, Bettendorf, Iowa, assignor to The Bendix Corporation, a corporation of Delaware
Filed June 28, 1967, Ser. No. 649,552
Int. Cl. G01c 21/00
U.S. Cl. 73—179          10 Claims

ABSTRACT OF THE DISCLOSURE

A rate of climb indicator in which accurate indications are obtained by employing both a diffuser-type restrictor and a capillary-type restrictor with a switching valve operable to put only the diffuser-type restrictor in operation at altitudes below about 30,000 feet and put only the capillary tube-type restrictor in operation at higher altitudes.

BACKGROUND OF THE INVENTION

The rate of climb indicator is used in aircraft instrumentation to indicate velocity of the aircraft in a vertical direction and operates by sensing altitude pressure changes. The pressure changes cause an air flow into or out of the sealed indicator case, and a restriction in the air flow path creates a pressure differential proportional to the air flow, i.e., rate of pressure altitude change. A diaphragm senses the differential pressure in the case and actuates a mechanical linkage to indicate the rate of climb. In order to have accurate indications in a given altitude range, the differential pressure across the air flow restriction must be linear in that altitude range. It has been discovered that present air flow restrictions of porcelain diffuser and orifice design are linear only from 0 to about 30,000 feet after which minus errors increase continually with increasing altitude, thus limiting the altitude range over which accurate indications are obtained.

SUMMARY OF THE INVENTION

The rate of climb indicator of this invention is usable over a wide range of altitudes to accurately indicate the rate of climb or descent of the aircraft. It utilizes a conventional hollow diaphragm disposed in a sealed case and connected to a pointer which is movable relative to a calibrated dial. The interior of the diaphragm is vented directly to the atmosphere exterior of the sealed case. The interior of the case communicates with the atmosphere only through one or the other of a pair of restircctor assemblies disposed in the case. Upon a change of atmospheric pressure due to a change of altitude of the aircraft on which the instrument is mounted, the pressure within the diaphragm will equalize imediately with the atmospheric pressure whereas the pressure in the case will equalize with a lag due to whichever one of the restrictor assemblies is in use at the time. This differntial pressure on opposite sides of the diaphragm causes the diaphragm to expand or contract in accordance with the rate of change of altitude to indicate the rate of climb or descent of the aircraft.

A switching valve, which automatically switches at an altitude of about 30,000 feet operates to render one of the restrictor assemblies inoperative at an altitude below about 30,000 feet and to render the other restrictor assembly inoperative at higher altitudes. Below the switching altitude, a restrictor assembly of the diffuser type, such as the one disclosed in U.S. Patent No. 2,147,198, is rendered operative for the reason that, as hereinabove explained, differential pressure across an air flow restriction of this type is substantially linear in the altitude range of from zero to about 30,000 feet. Above the switching altitude, a capillary-type restrictor assembly, such as disclosed in U.S. Patent No. 2,159,703, is rendered effective for the reason that it has been discovered that such a restrictor has linear characteristics in the altitude range of from about 30,000 feet to 90,000 feet. It has been dicovered that the capillary-type restriction has minor errors increasing continuously with decreasing altitude below about 30,000 feet. Thus, the rate of climb indicator of this invention, by utilizing the diffusion-type restrictor below altitudes of about 30,000 feet and the capillary-type restrictor at higher altitudes, provides for an accurate indication of vertical velocity of the aircraft over an increased altitude range.

It is an object of this invention, therefore, to provide an improved rate of climb indicator.

Further objects, features and advantages of this invention will become apparent from a consideration of the following description, the appended claims, and the accompanying drawing in which:

Figure 1:
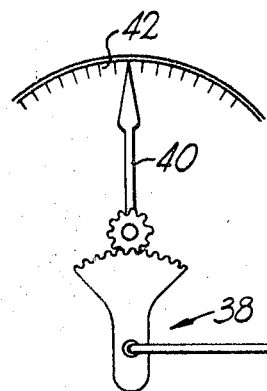
FIGURE 1 is a schematic illustration of the rate of climb indicator of this invention.

With reference to the drawing, the indicator of this invention, indicated generally at 10, is illustrated schematically in FIG. 1 as including a sealed case 12 in which a diaphragm 14 of hollow vessel type is disposed. The inner side 16 of the hollow diaphragm 14 communicates directly with the ambient atmosphere outside the case 12 through a main passage 18 and a branch passage 20. The outer side 22 of the hollow diaphragm 14 is exposed to the pressure in the interior 24 of the case 12. The interior 24 of the case 12 communicates with the ambient atmosphere through the main passage 18, a valve chamber 26, and a pair of restrictor assemblies 28 and 30 which are connected to the valve chamber 26 by passages 32 and 34, respectively. The restrictor assembly 28 is of the porous diffusion type, conventionally formed of porcelain, such as disclosed in U.S. Patent No. 2,147,108 which operates on the principle of molecular diffusion through a wall of predetermined porosity. The restrictor assembly 30 is of the capillary tube type shown in U.S. Patent No. 2,159,703 and operates on the principle of a capillary leak through a restricted passage. Both of the assemblies 28 and 30 are provided with temperature compensating units 36 of conventional type such as is well known in the art for eliminating pressure differential changes due to temperature.

The diaphragm 16 is connected by a mechanical linkage 38 to a pointer 40 associated with a dial 42 so that expansion and contraction of the diaphragm 16 results in movement of the pointer 40 relative to the dial 42. A switching valve, indicated generally at 44, is provided in the valve chamber 26 for moving a pair of valve members 46 and 48 between positions in which either the passage 32 or the passage 34 communicates with the valve chambers 26, and the other passage is blocked. The valve 44 includes a pressure responsive device, which in the preferred embodiment of the invention is a snap action aneroid 50 that will snap between the above described positions at a preselected altitude.

Figure 2:
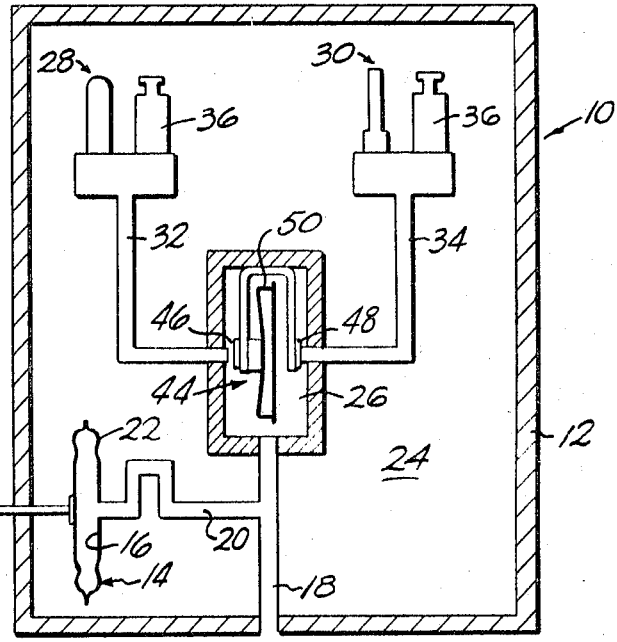
FIGURE 2 is a graph illustrating the air flow restriction characteristic curves for the diffuser and capillary-type restrictor assemblies employed in a preferred embodiment of the indicator of this invention.
Figure 2:
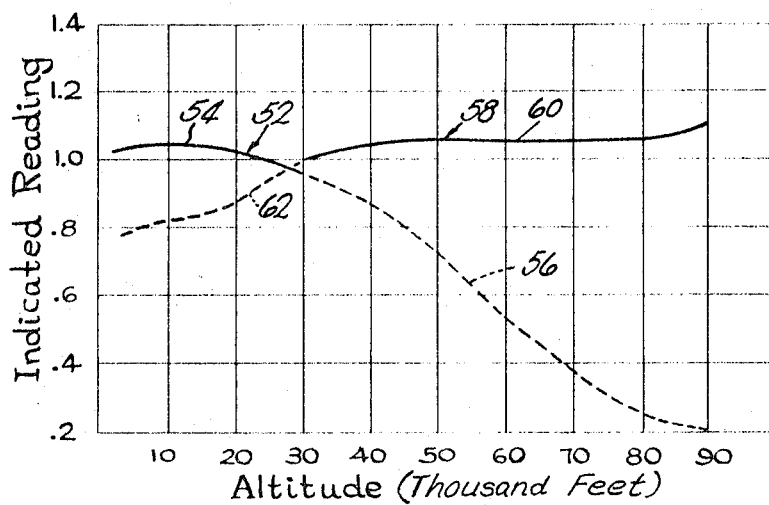

The air flow restriction characteristics for the diffuser-type resistor assembly 28 are indicated in the chart in FIG. 2 by the line 52 which is illustrated as having a solid line portion 54 and a broken line portion 56. The air flow restriction characteristics of the capillary-type resistor assembly 30 are indicated by the line 58 which has the solid line portion 60 and the broken line portion 62. The graph of FIG. 2 is a plot of the indicated reading for an instrument equipped with the restrictor assemblies 28 and 30 for changing altitudes wherein a constant rate of change indicated at about 1.0 is maintained. As shown in FIG. 2, the lines 52 and 58 cross at approximately an altitude of 30,000 feet. Below 30,000 feet, the differential pressure across the air flow restrictor in the diffuser assembly 28 is substantially linear, as indicated by the fact that the line portion 54 runs very close to 1.0. Above 30,000 feet, the portion 56 of line 52 departs substantially from this reading indicating that the assembly 28 is increasingly inaccurate at these altitudes. The line 58 indicates that above 30,000 feet, the capillary-type restrictor assembly 30 is very accurate because the line portion 60 remains very close to the 1.0 reading over this range. Below 30,000 feet, the restrictor assembly 30 becomes increasingly inaccurate, as indicated by the position of the line portion 62.

The indicator 10 of this invention makes use of these discovered characteristics of the assemblies 28 and 30 by providing the switching valve 44 which renders the restrictor 30 ineffective at altitudes below about 30,000 feet by moving the valve member 48 to the closed position shown in FIG. 1. At about an altitude of 30,000 feet, the aneroid 50 snaps to an expanded position in which it moves the valve member 48 off its seat and moves the valve member 46 to a seated position so as to render the diffusion-type restrictor 28 ineffective at these higher altitudes. As a result, the diffusion-type restrictor assembly 28 is employed below about 30,000 feet and the capillary-type restrictor 30 is utilized at altitudes above about 30,000 feet. The result is that the air flow characteristics of the combined assemblies 28 and 30 will be represented in FIG. 2 by the line portions 54 and 60 which remain very close to the indicated reading of 1.0.

Figure 3:
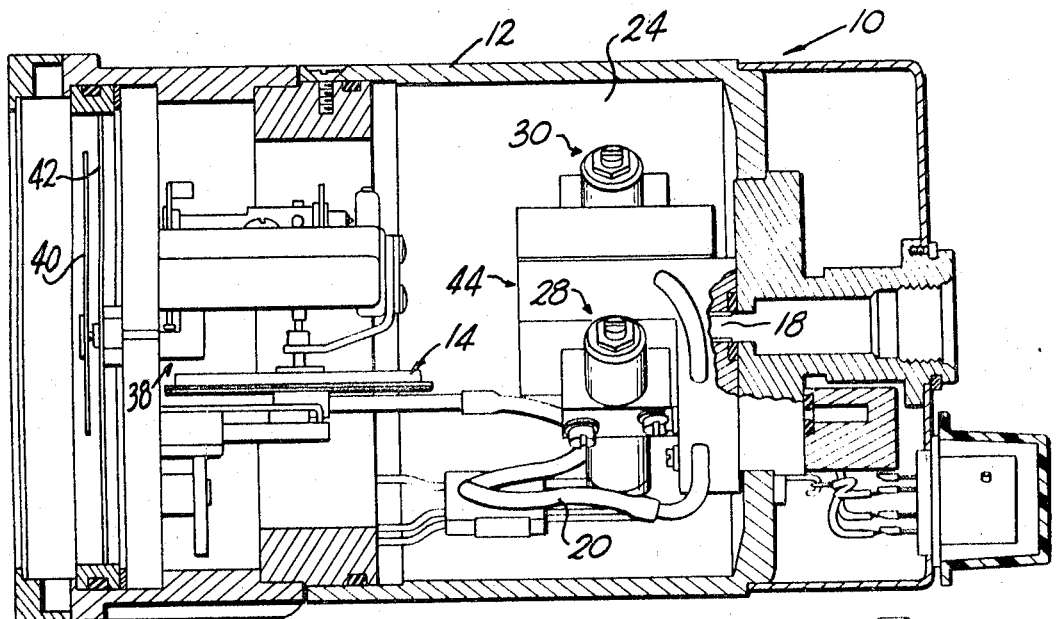
FIGURE 3 is a sectional view of a climb indicator of this invention.
Figure 5:
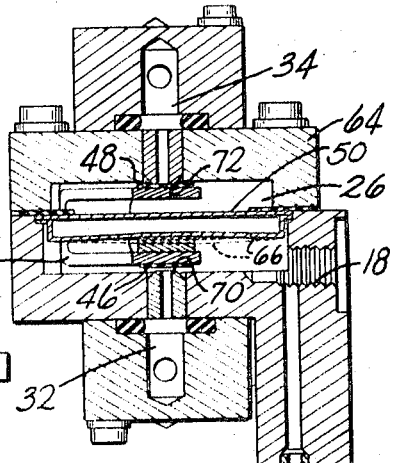
FIGURE 5 is a transverse sectional view of a portion of the indicator of this invention as seen from substantially the line 5—5 in FIG. 4.
Figure 4:
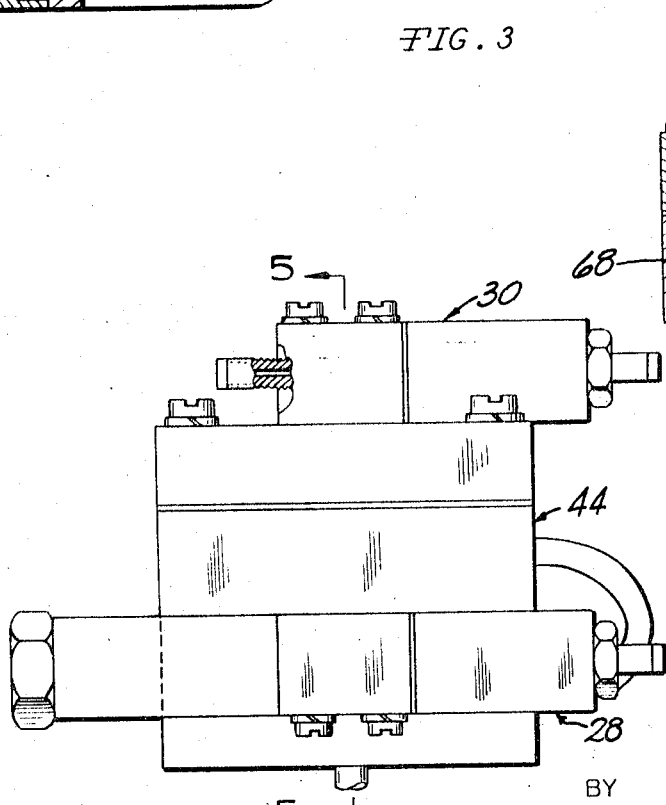
FIGURE 4 is an elevational view of a portion of the indicator of this invention shown in FIG. 3.

In the structural embodiment of the invention, indicated in FIGS. 3–5, inclusive, numerals corresponding to those used in FIG. 1 are employed to indicate like parts. As best appears in FIG. 5, the valve chamber 26 is formed by a casing 64 on which the snap acting aneroid 50 is mounted. The aneroid 50 has a wall 66 which snaps between the solid and broken line positions indicated in FIG. 5. At altitudes below about 30,000 feet the wall 66 is in substantially its solid line position and altitudes above about 30,000 feet the wall 66 is in its broken line position. A cage member 68 is connected to and extending between the valve members 46 and 48 so as to maintain the valve members in a predetermined spaced relation in which the valve members are spaced apart a slightly smaller distance than their corresponding valve seats 70 and 72 are spaced. The valve seats 70 and 72 are adjustably mounted for accomplishing this relative spacing. As shown in FIG. 5, when the aneroid wall 66 is its solid line position the valve member 48 is engaged with its seat 72 so as to block communication between the valve chamber 26 and the passage 34 leading to the capillary restriction assembly 30. Valve member 46 is spaced from its seat 72 so that the restrictor assembly 28 communicates with the ambient atmosphere through the valve chamber 26.

When the ambient pressure conditions cause the aneroid wall 66 to snap to its broken line position, it moves the valve member 46 secured thereto to a position engaged with the seat 70. Movement of the valve member 46 causes a corresponding movement of the cage 68 which in turn moves the valve member 48 to an unseated position relative to its seat 72. Consequently, in this position of the aneroid wall 66, the valve member 46 blocks communication between the valve chamber 26 and the passage 32 leading to the diffuser-type restrictor assembly 28. The passage 34 for the capillary-type restrictor assembly 30 is, however, at this time in direct communication through the valve seat 72 with the valve chamber 26, so that air flow between the interior 24 of case 12 and the exterior of the case is through restrictor assembly 30.

In the operation of the indicator 10, assume that the aircraft in which the indicator 10 is installed is at an altitude below about 30,000 feet. At such time, switching valve 44 is in a position in which the valve member 48 is seated and the valve member 46 is unseated. As a result, when the aircraft changes altitude, a pressure differential, relating to the differential pressure across the air flow restriction provided by the diffuser-type assembly 28, will be created between the inner and outer diaphragm sides 16 and 22, respectively. The diaphragm 14 will thus expand or contract to actuate the pointer 40, through the mechanical linkage 38, so as to indicate the vertical velocity of the aircraft. When the aircraft travels upward through the altitude for which the snap acting aneroid 50 is calibrated, which is about 30,000 feet in the preferred embodiment of the invention, the aneroid wall 66 will snap to its broken line position in which it unseats the valve member 48 and seats the valve member 46, thus precluding air flow through the diffusion-type restrictor assembly 28 so as to render it ineffective, and making the capillary tube-type restrictor 30 operative.

Thereafter, so long as the aircraft remains above 30,000 feet, the pressure differential created between the diaphram inner side 16 and outer side 22, when the aircraft changes altitude, will be determined by the differential pressure across the air flow restriction created by the restrictor assembly 30. When the aircraft descends to an altitude below about 30,000 feet, the aneroid wall 66 will return to its solid line position shown in FIG. 5 to again unseat the valve member 46 to make the diffuser-type restrictor assembly 28 operative and seat the valve member 48 to render the capillary-type restrictor 30 ineffective. It can thus be seen, that in the indicator 10, full advantage of the differential pressure characteristics of the different restrictor assemblies 28 and 30 is taken so as to achieve an indicator 10 which is accurate over a wide range of altitudes.

It will be understood that the rate of climb indicator which is herein disclosed and described is presented for purposes of explanation and illustration and is not intended to indicate limits of the invention.

I claim:
1. In a rate of climb indicator which includes indicator means and means responsive to a pressure differential on opposite sides thereof for actuating said indicator means, wherein one side of said means is in continuous communication with the ambient atmosphere, the improvement comprising,
two different restrictor assemblies arranged so that the opposite side of said pressure responsive means communicates with the ambient atmosphere only through one or the other of said assemblies,
and altitude responsive means operative to render one of said assemblies ineffective only below a predetermined altitude and operative to render the other one of said assemblies ineffective only above said predetermined altitude so that below said altitude said opposite side of said pressure responsive means is in communication with the ambient atmosphere only through said other one of said assemblies and above said altitude said opposite side of said pressure responsive means is in communication with the ambient atmosphere only through said one of said assemblies.

2. A rate of climb indicator according to claim 1 wherein said one restrictor assembly provides a capillary restriction.

3. A rate of climb indicator according to claim 1 wherein said other one of said restrictor assemblies includes a porous diffusing means providing communication between said one side of said pressure responsive means and the ambient atmosphere by molecular diffusion through said porous means.

4. A rate of climb indicator according to claim 1 wherein said one restrictor assembly provides a capillary restriction and wherein said other one of said restrictor assemblies provides a porous diffusion restriction.

5. A rate of climb indicator according to claim 1 wherein said altitude responsive means includes a pressure responsive switching valve.

6. A rate of climb indicator according to claim 1 wherein said altitude responsive means includes
   passage means connecting said restrictor assemblies with the ambient atmosphere, and
   pressure responsive valve means in said passage movable between two positions in said passage means.

7. A rate of climb indicator according to claim 6 wherein said valve means includes a pair of valve seats each of which communicates with one of said restrictor assemblies, a pair of valve members corresponding to said seats, and a snap action aneroid device movable between two positions and connected to said valve members, said aneroid device in one position providing for a seating of one of said valve members and an unseating of the other one of said valve members and in the other position providing for unseating of said one valve member and seating of the other one of said valve members.

8. A rate of climb indicator according to claim 7 further including a sealed case and wherein said pressure responsive means is a hollow vessel, the interior of which is in communication with the ambient atmosphere, and wherein communication of the interior of said case with the ambient atmosphere is only through one or the other of said restrictor assemblies.

9. A rate of climb indicator according to claim 7 further including means connecting said valve members so as to maintain the valve members in a predetermined spaced relation.

10. A rate of climb indicator according to claim 7 wherein said aneroid device is calibrated to snap between said two positions at an altitude of about 30,000 feet.

References Cited

UNITED STATES PATENTS

| | | | |
|---|---|---|---|
| 2,147,108 | 2/1939 | Rylsky | 73—179 |
| 2,159,703 | 5/1939 | Koch | 73—179 |
| 3,222,932 | 12/1965 | Henneman | 73—182 XR |

LOUIS R. PRINCE, Primary Examiner

DONALD O. WOODIEL, Assistant Examiner